No. 690,344. Patented Dec. 31, 1901.
S. E. BALDWIN.
NUT LOCK.
(Application filed June 6, 1901.)
(No Model.)

Witnesses
J. P. Brett
Harry Ellis Chandlee

Inventor
S. E. Baldwin,
by Chandlee & Chandlee
Attorneys

UNITED STATES PATENT OFFICE.

SAMUEL E. BALDWIN, OF HAVRE DE GRACE, MARYLAND.

NUT-LOCK.

SPECIFICATION forming part of Letters Patent No. 690,344, dated December 31, 1901.

Application filed June 6, 1901. Serial No. 63,454. (No model.)

*To all whom it may concern:*

Be it known that I, SAMUEL E. BALDWIN, a citizen of the United States, residing at Havre de Grace, in the county of Harford, State of Maryland, have invented certain new and useful Improvements in Nut-Locks; and I do hereby declare the following to be a full, clear, and exact description of the invention, such as will enable others skilled in the art to which it appertains to make and use the same.

This invention relates to nut-locks, and more particularly to the class of base-washer nut-locks; and it has for its object to provide a construction wherein the split washer will be carried by the nut and will be pressed into the material into which the nut is screwed to hold the nut from return movement.

A further object of the invention is to provide a construction wherein the washer will be so mounted upon the nut that if the nut is turned in a direction to unscrew it after it has been tightened up the end of the washer will move laterally to bite into the material against which the nut is screwed in a new place, so as to hold the nut firmly from backing off.

Figure 1:
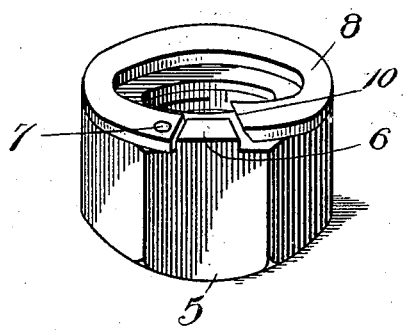
Figure 2:
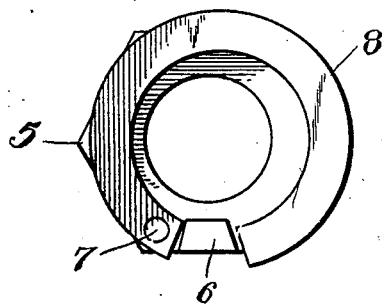
Figure 3:
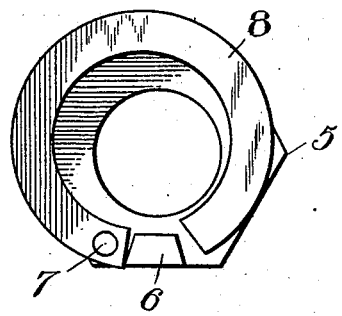

In the drawings forming a portion of this specification, and in which like numerals of reference indicate similar parts in the several views, Figure 1 is a bottom perspective view of a nut equipped with a lock in accordance with the present invention. Fig. 2 is a bottom plan view showing the nut with its lock in the position assumed when the nut is being screwed into place and after the washer has engaged the material against which the nut is to be screwed. Fig. 3 is a view similar to Fig. 2 and showing the position of the washer when the nut starts to back off.

Referring now to the drawings, there is shown a nut 5, which is formed of a single piece of metal and on the bottom face of which is formed a lug 6, adjacent to one end of which and spaced therefrom is a cylindrical pin 7, the ends of the lug 6 lying substantially radially of the nut.

The locking device for the nut consists of a ring 8, having a segment removed therefrom slightly wider than the length of the lug 6, and this ring has its ends sprung, so that it forms a section of a helix. Through one end portion of the ring is formed a perforation which receives the pin 7 on the nut, the extreme end of the ring being so spaced from the adjacent end of the lug 6 that the lug acts as a stop to limit the pivotal movement of the ring on the pin. When the ring is engaged with the pin, one end of the ring lies flat against the bottom face of the nut, while the remaining portion of the ring diverges therefrom, and the free end of the ring is beveled so as to form a sharpened tooth 10 at the lower side. The ring is of spring metal, so that while the free end thereof stands normally away from the nut it may be forced to lie close against the face of the nut.

The operation of this lock will be understood upon reference to the drawings and is as follows: The nut is screwed upon a threaded body, such as a bolt, in the usual manner until the tooth or free end of the split ring strikes the face of the material through which the bolt is passed, it being understood that if the nut is screwed upon the end of a wagon-spindle the free end of the ring will strike the shoulder at the base of the threaded end. As the nut is rotated farther the end of the ring dragging against the face of the material through which the bolt is passed is moved pivotally to the position shown in Fig. 2, and as the nut is screwed up farther the tension of the ring is increased, so that when the nut finally is screwed up as far as it will go the tension is sufficient to sink the tooth at the end of the ring to some extent into the said material, the ring being then in the position shown in Fig. 2, its pivotal movement having been limited by the lug 6. Supposing now that the nut be started to back off, the pressure on the free end of the ring will tend to move it pivotally to the position shown in Fig. 3, and as the ring moves in this direction the tooth cuts into virgin material and holds the nut firmly against further backward movement. It will thus be seen that instead of having a simple action and instead of the tooth engaging the material in the path which has been smoothed by rotation of the ring in screwing up the nut the tooth is deflected from its path and holds more firmly. This is particularly true in the case of screwing up the nut against soft material, such as wood, when in screwing up the nut the ring will form a slight annular groove in the wood, and when the ring is started in the opposite direction the ring will engage in the side wall of the groove.

It will be understood that in practice the present lock may be applied to nuts of various shapes and sizes and for different specific purposes and that any suitable materials and proportions may be used for the various parts without departing from the spirit of the invention.

What is claimed is—

1. The combination with a nut, of a split ring pivotally mounted on the under side of the nut and having one end sprung away from the nut and provided with a tooth, the tooth being adapted for movement with the ring toward and away from the center of the nut, and means for limiting the pivotal movement of the ring.

2. The combination with a nut having a lug on its under face and an adjacent pivot-pin, of a split spring ring bent to form a section of a helix, one end of the ring being pivotally mounted upon the pin and adapted to engage the lug to limit its pivotal movement, and the free end of the ring being beveled to form a tooth at the lower side thereof and lying normally deflected from the lower face of the nut in the direction of rotation of the nut to screw it up, whereby the ring will have pivotal movement when the nut is backed off.

In testimony whereof I hereunto sign my name, in the presence of two subscribing witnesses, on the 27th day of May, 1901.

SAMUEL E. BALDWIN.

Witnesses:
GEROGE F. BALDWIN,
W. G. FORSYTHE.